United States Patent
Mullenaux

(10) Patent No.: US 10,513,213 B1
(45) Date of Patent: Dec. 24, 2019

(54) VEHICULAR WATER-DISPENSING SYSTEM

(71) Applicant: Thomas Mullenaux, San Pedro, CA (US)

(72) Inventor: Thomas Mullenaux, San Pedro, CA (US)

(*) Notice: Subject to any disclaimer, the term of this patent is extended or adjusted under 35 U.S.C. 154(b) by 0 days.

(21) Appl. No.: 16/149,322

(22) Filed: Oct. 2, 2018

Related U.S. Application Data

(63) Continuation-in-part of application No. 16/140,603, filed on Sep. 25, 2018, now Pat. No. 10,405,670.

(51) Int. Cl.
| | |
|---|---|
| *B60N 3/18* | (2006.01) |
| *B60N 3/10* | (2006.01) |
| *B67D 1/00* | (2006.01) |
| *B67D 1/08* | (2006.01) |

(52) U.S. Cl.
CPC ............ *B60N 3/18* (2013.01); *B60N 3/104* (2013.01); *B60N 3/102* (2013.01); *B67D 1/0009* (2013.01); *B67D 1/0857* (2013.01); *B67D 2001/0097* (2013.01); *B67D 2210/00047* (2013.01); *Y10T 137/6881* (2015.04); *Y10T 137/6888* (2015.04); *Y10T 137/6899* (2015.04)

(58) Field of Classification Search
CPC ..... B60N 3/18; B60N 3/104; Y10T 137/6881; Y10T 137/6888; Y10T 137/6899
See application file for complete search history.

(56) References Cited

U.S. PATENT DOCUMENTS

| | | | |
|---|---|---|---|
| 3,745,596 A | 7/1973 | Copeland | |
| 4,140,150 A * | 2/1979 | Rundell | B60N 3/18 137/340 |
| 4,274,566 A * | 6/1981 | Rowe | B62J 11/00 222/610 |
| 4,842,724 A * | 6/1989 | Bray | B01D 61/08 210/104 |
| 5,090,075 A | 2/1992 | Larson | |
| D342,393 S | 12/1993 | Discepolo | |
| 5,271,837 A | 12/1993 | Discepolo | |
| 6,513,343 B2 | 2/2003 | Pahl | |
| 6,851,275 B2 * | 2/2005 | Kreutzmann | A42B 3/048 62/457.2 |
| 2016/0231029 A1 | 8/2016 | Pan | |

FOREIGN PATENT DOCUMENTS

FR 2595678 A1 * 9/1987 .............. B60N 3/16

OTHER PUBLICATIONS

Machine translation FR 2595678.*

* cited by examiner

*Primary Examiner* — Kevin F Murphy

(57) ABSTRACT

The vehicular water-dispensing system is a water dispensing system adapted for use in a vehicle. Water is stored within a reservoir located in the trunk of the vehicle and may be pumped through a filter to one of two retractable hoses. One retractable hose is provided on each side of the dashboard and the retractable hoses may be pulled out of the dashboard to use. Each retractable hose terminates with a mouthpiece. When either retractable hose is released that hose is pulled back into the dashboard. When not in use, the retractable hoses are wound around spring-loaded reels. The vehicular water-dispensing system may further comprise a refrigeration system adjacent to the reservoir to chill the water.

11 Claims, 5 Drawing Sheets

VEHICULAR WATER-DISPENSING SYSTEM

CROSS REFERENCES TO RELATED APPLICATIONS

This application is a continuation-in-part of U.S. application Ser. No. 16/140,603, which was filed on Sep. 25, 2018 by the applicant.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of passenger vehicle and water dispenser, more specifically, a vehicular water-dispensing system.

SUMMARY OF INVENTION

The vehicular water-dispensing system is a water dispensing system adapted for use in a vehicle. Water is stored within a reservoir located in the trunk of the vehicle and may be pumped through a filter to one of two retractable hoses. One retractable hose is provided on each side of the dashboard and the retractable hoses may be pulled out of the dashboard to use. Each retractable hose terminates with a mouthpiece. When either retractable hose is released that hose is pulled back into the dashboard. When not in use, the retractable hoses are wound around spring-loaded reels. The vehicular water-dispensing system may further comprise a refrigeration system adjacent to the reservoir to chill the water.

An object of the invention is to provide a water dispensing system adapted to dispense water to occupants of a vehicle through a pair of mouthpieces attached to retraceable hoses accessible from the dashboard of the vehicle.

Another object of the invention is to provide a reservoir to hold the water to be dispensed.

A further object of the invention is to provide a pump to move the water through the water dispensing system and a filter to purify the water passing through the water dispensing system.

Yet another object of the invention is to provide a refrigeration system adjacent to the reservoir to chill the water.

These together with additional objects, features and advantages of the vehicular water-dispensing system will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicular water-dispensing system in detail, it is to be understood that the vehicular water-dispensing system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicular water-dispensing system.

It is therefore important that the claims be regarded as including such equivalent construction insofar as they do not depart from the spirit and scope of the vehicular water-dispensing system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
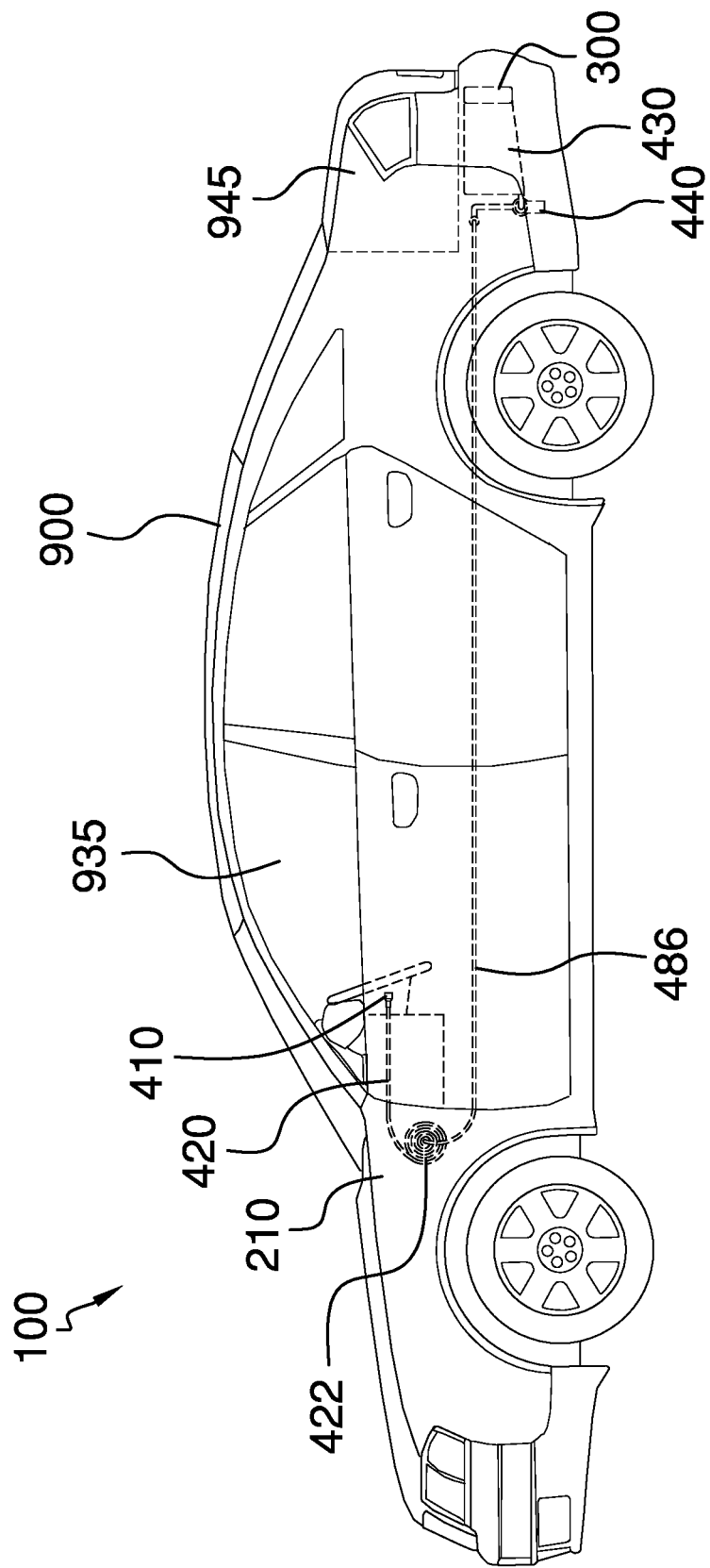
FIG. 1 is a side view of an embodiment of the disclosure.
Figure 2:
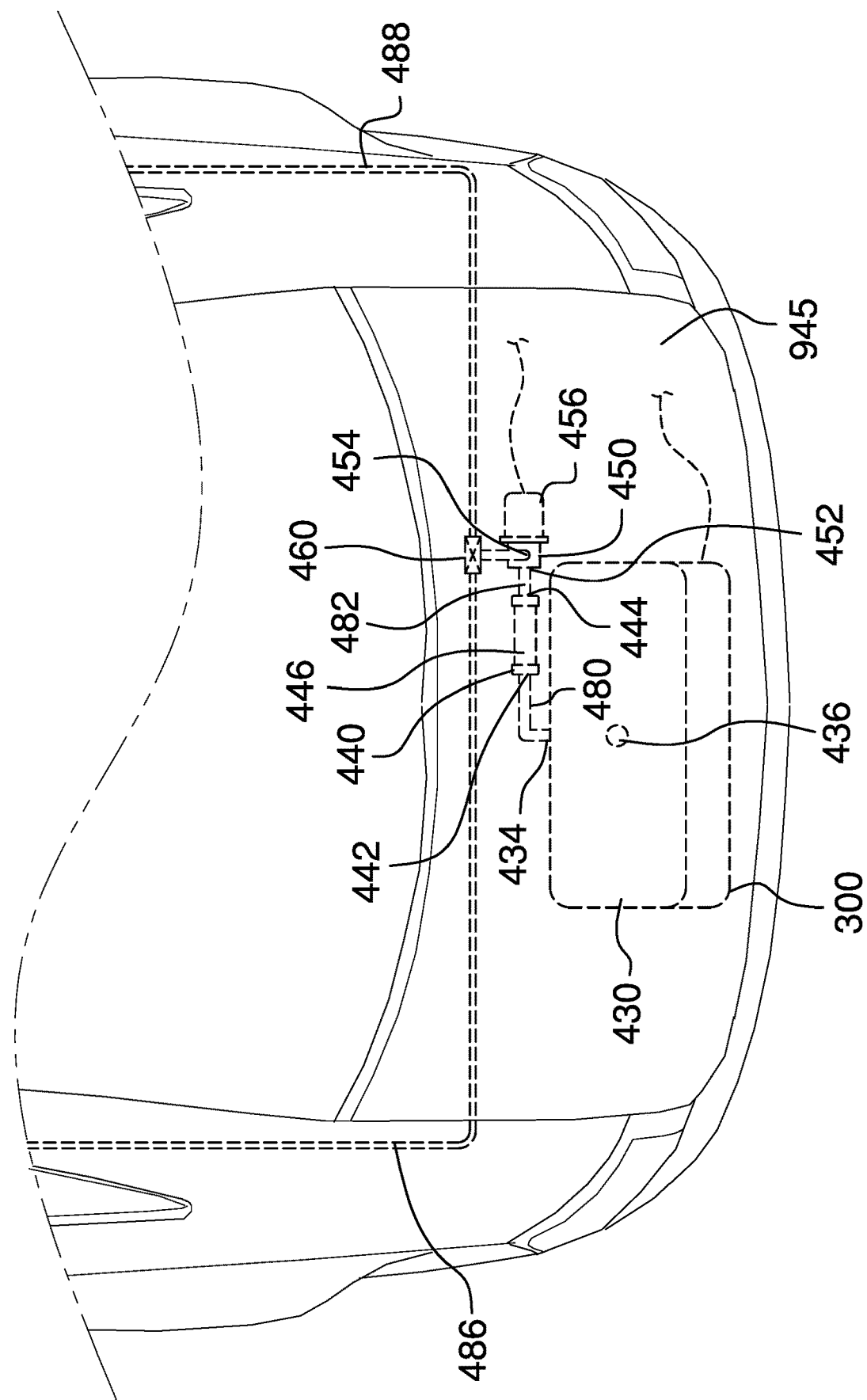
FIG. 2 is a top view of an embodiment of the disclosure illustrating the trunk portion of the vehicle.
Figure 3:
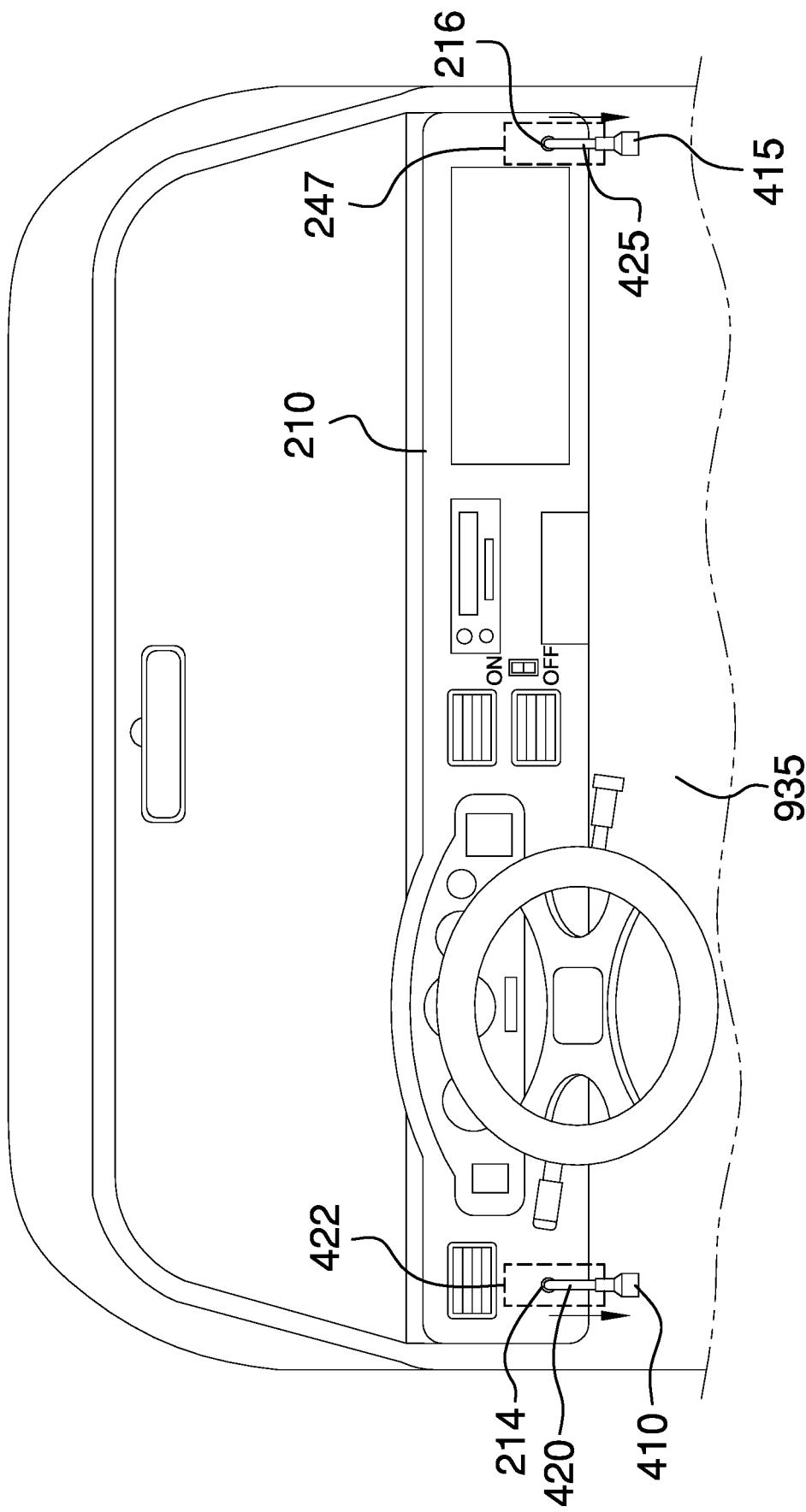
FIG. 3 is a detail view of an embodiment of the disclosure illustrating the dashboard portion of the vehicle.
Figure 4:
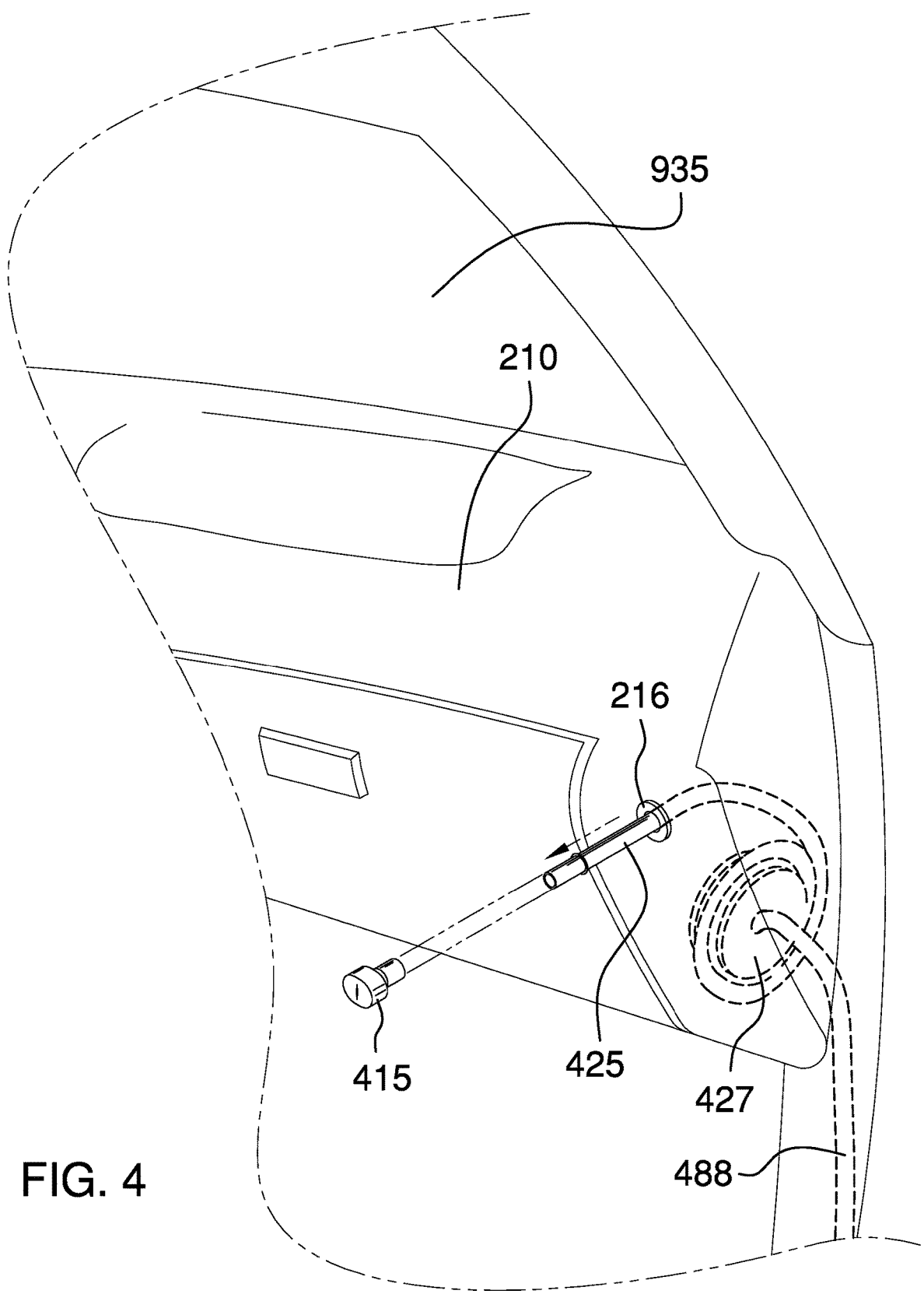
FIG. 4 is a detail view of an embodiment of the disclosure illustrating the second mouthpiece, second retractable hose, and second reel on the passenger side of the dashboard.
Figure 5:
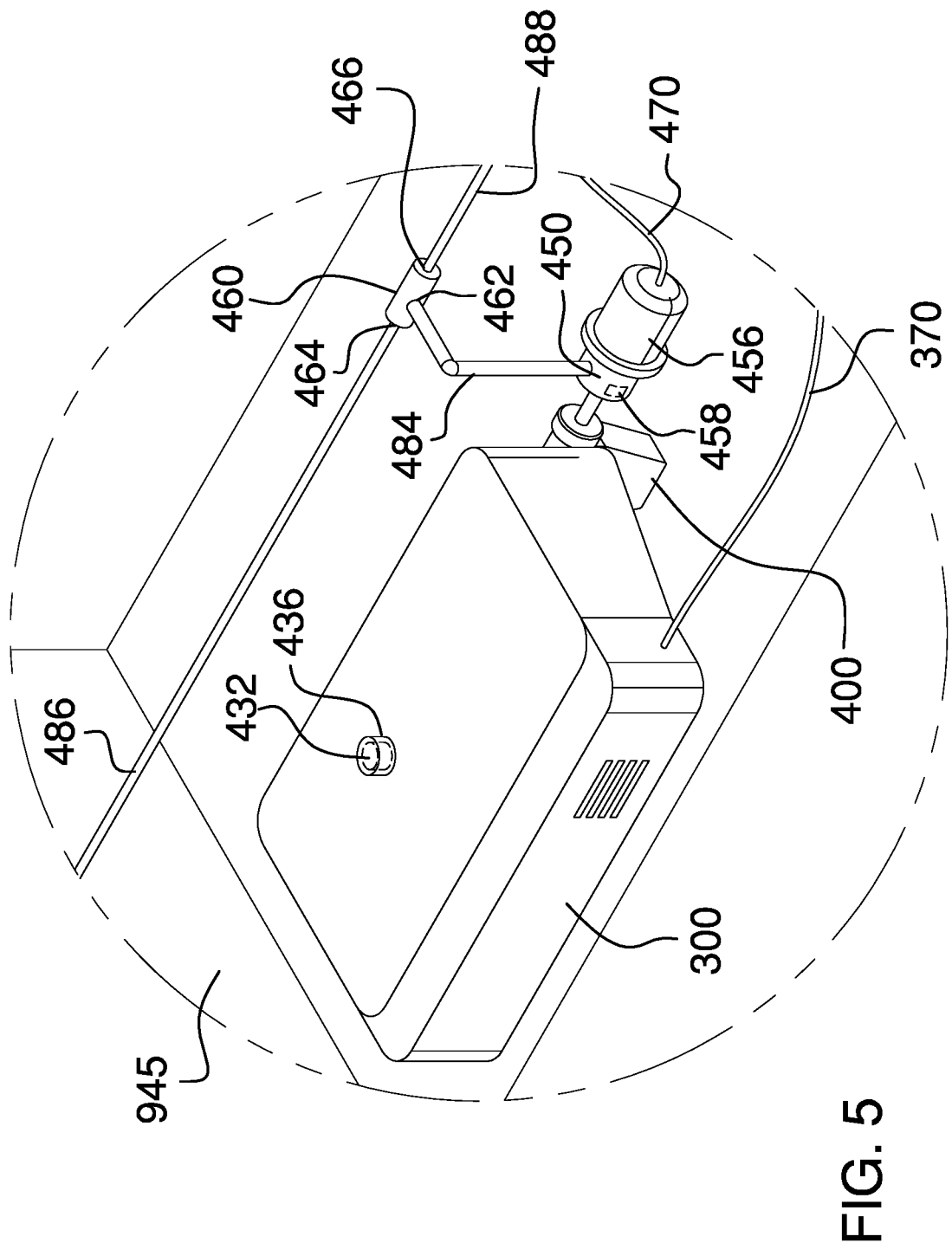
FIG. 5 is a detail view of an embodiment of the disclosure illustrating the reservoir, filter, pump, valve, and refrigeration system in the trunk of the vehicle.

Detailed reference will now be made to a first potential embodiment of the disclosure, which is illustrated in FIGS. 1 through 5.

The vehicular water-dispensing system 100 (hereinafter invention) comprises a water dispensing system and a refrigeration system 300. The invention 100 is adapted to dispense water to occupants of a vehicle 900 from a water reservoir 430 located in a trunk 945 of the vehicle 900 via a first retractable hose 420 with a first mouthpiece 410 and a second retractable hose 425 with a second mouthpiece 415 both of which are accessible within a passenger compartment 935 of the vehicle 900.

The water dispensing system comprises the water reservoir 430, a filter 440, a pump 450, a valve 460, the first retractable hose 420, the second retractable hose 425, the first mouthpiece 410, and the second mouthpiece 415. The water stored in the water reservoir 430 may flow through the filter 440 to remove impurities and may be pumped to the valve 460. The valve 460 may start and stop the flow of the water to the first mouthpiece 410 via the first retractable hose 420 or to the second mouthpiece 415 via the second retractable hose 425.

The water reservoir 430 may be a container for holding the water. The water reservoir 430 may have a refill port 432 located on the top of the water reservoir 430 and may have a reservoir outlet 434 located on the bottom of the water reservoir 430. The refill port 432 may be covered by a filler cap 436 that may be removed to refill the water reservoir 430. The water flowing out of the reservoir outlet 434 may be routed to the filter 440 by a first tube 480.

The filter 440 may house porous material that removes impurities from the water as the water flow through the filter 440. The filter 440 may comprise a filter inlet 442 and a filter outlet 444. The water may enter the filter 440 through the filter inlet 442 and may exit the filter 440 through the filter outlet 444. As the water passes through the filter 440 impurities in the water may become trapped within the filter 440 such that the water exiting through the filter outlet 444 is cleaner than the water that entered the filter 440. In some embodiments, the porous material may comprise a filter cartridge 446 that may be replaceable. The water flowing out of the filter 440 may be routed to the pump 450 via a second tube 482

The pump 450 may comprise a pump inlet 452 and a pump outlet 454. The pump 450 may force the water from the pump inlet 452 to the pump outlet 454 when the pump 450 is activated. As non-limiting examples, the pump 450 may be a reciprocating pump or a centrifugal pump. The pump 450 may be mechanically linked to an electric motor 456. The pump 450 may be activated when the electric motor 456 is energized. The electric motor 456 may convert electrical energy into mechanical energy. The electric motor 456 may be energized by electricity provided from the vehicle 900 via a pump electrical cord 470. In some embodiments, a pressure sensitive switch 458 located in the pump 450 may control the energization of the electric motor 456 such that the electric motor 456 is only energized when the pressure sensitive switch 458 senses demand for the water at the pump outlet 454. The water flowing out of the pump 450 may be routed to the valve 460 via a third tube 484.

The valve 460 may comprise a valve inlet 462, a first valve outlet 464, and a second valve outlet 466. The valve 460 may permit and block the flow of the water from the valve inlet 462 to the first valve outlet 464 or from the valve inlet 462 to the second valve outlet 466. The valve 460 may permit the flow of the water from the valve inlet 462 to the first valve outlet 464 when the valve 460 senses suction applied to the first valve outlet 464. The valve 460 may permit the flow of the water from the valve inlet 462 to the second valve outlet 466 when the valve 460 senses suction applied to the second valve outlet 466. The water flowing out of the first valve outlet 464 may be routed to the first retractable hose 420 via a fourth tube 486. The water flowing out of the second valve outlet 466 may be routed to the second retractable hose 425 via a fifth tube 488. The fourth tube 486 and the fifth tube 488 may be routed through a chassis and/or a body of the vehicle 900 between the trunk 945 and a dashboard 210.

Those skilled in the art will recognize that the order of certain components may be changed without departing from the spirit and scope of the invention 100. As a non-limiting example, the positions of the filter 440 and the pump 450 may be reversed in some embodiments.

The first retractable hose 420 may be tubing that may be pulled out of the left side of the dashboard 210 and which will retract into the dashboard 210 when released. The first retractable hose 420 may wind around a first reel 422 when retracted into the dashboard 210. The first reel 422 may be spring-load and pressure applied to the first retractable hose 420 at the front of the dashboard 210 may allow the first reel 422 to rotate such that the first retractable hose 420 may be pulled off of the first reel 422 and out of the front of the dashboard 210. When the pressure is released, the first reel 422 may rotate in the opposite direction and may pull the first retractable hose 420 back into the dashboard 210 and around the first reel 422.

The second retractable hose 425 may be tubing that may be pulled out of the right side of the dashboard 210 and which will retract into the dashboard 210 when released. The second retractable hose 425 may wind around a second reel 427 when retracted into the dashboard 210. The second reel 427 may be spring-load and pressure applied to the second retractable hose 425 at the front of the dashboard 210 may allow the second reel 427 to rotate such that the second retractable hose 425 may be pulled off of the second reel 427 and out of the front of the dashboard 210. When the pressure is released, the second reel 427 may rotate in the opposite direction and may pull the second retractable hose 425 back into the dashboard 210 and around the second reel 427.

The first mouthpiece 410 may be adapted to deliver the water from the first retractable hose 420 into the mouth of one of the occupants of the vehicle 900. The first mouthpiece 410 may couple to the end of the first retractable hose 420 on the left side of the dashboard 210. The first mouthpiece 410 may be removable and replaceable.

The second mouthpiece 415 may be adapted to deliver the water from the second retractable hose 425 into the mouth of one of the occupants of the vehicle 900. The second mouthpiece 415 may couple to the end of the second retractable hose 425 on the right side of the dashboard 210. The second mouthpiece 415 may be removable and replaceable.

The refrigeration system 300 may chill the water that is stored in the water reservoir 430. The refrigeration system 300 may be located adjacent to the water reservoir 430. The refrigeration system 300 may be energized by electricity provided from the vehicle 900 via a refrigeration system electrical cord 370. The refrigeration system 300 may comprise one or more evaporators, one or more condensers, one or more compressors, one or more expansion valves, one or more thermoelectric coolers, or combinations thereof.

In some embodiments, the one or more evaporators, the one or more condensers, the one or more compressors, the one or more expansion valves, or combinations thereof may be shared between the refrigeration system 300 and a heating and cooling system of the vehicle 900.

The invention 100 may further comprise the dashboard 210 of the vehicle 900. The dashboard 210 may comprises an instrument cluster, entertainment equipment, a glove box, and other standard components of a dashboard as known in the prior art. The dashboard 210 may be modified by placing a first hose aperture 214 and a second hose aperture 216 on opposing sides of the dashboard 210 and by mounting the first reel 422 and the second reel 427 behind the dashboard 210.

In use, the water is placed into the water reservoir 430 by opening the trunk 945, removing the filler cap 436, and pouring the water into the water reservoir 430. When one of the occupants on the left side of the vehicle 900 wants a drink of the water, they may grasp the first retractable hose 420 and pull it from the dashboard 210. They may place the first mouthpiece 410 into their mouth and suck on the first mouthpiece 410. The valve 460 may sense the suction at the first valve outlet 464 and may release the water to flow from the valve inlet 462 to the first valve outlet 464. The pressure sensitive switch 458 may sense a drop in pressure at the pump outlet 454 and may energize the electric motor 456. Energizing the electric motor 456 may activate the pump 450. Activating the pump 450 may force the water from the water reservoir 430 through the filter 440 and on to the valve 460. When the first retractable hose 420 is released, it is retracted back into the dashboard 210 and wraps around the first reel 422.

When one of the occupants on the right side of the vehicle 900 wants a drink of the water, they may grasp the second retractable hose 425 and pull it from the dashboard 210. They may place the second mouthpiece 415 into their mouth and suck on the second mouthpiece 415. The valve 460 may sense the suction at the second valve outlet 466 and may release the water to flow from the valve inlet 462 to the second valve outlet 466. The pressure sensitive switch 458 may sense a drop in pressure at the pump outlet 454 and may energize the electric motor 456. Energizing the electric motor 456 may activate the pump 450. Activating the pump 450 may force the water from the water reservoir 430 through the filter 440 and on to the valve 460. When the second retractable hose 425 is released, it is retracted back into the dashboard 210 and wraps around the second reel 427.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, an "aperture" is an opening in a surface. Aperture may be synonymous with hole, slit, crack, gap, slot, or opening.

As used in this disclosure, the term "body" refers to the structure that forms the exterior surfaces of a vehicle. The body may be formed from a plurality of panels.

As used herein, the words "couple", "couples", "coupled" or "coupling", refer to connecting, either directly or indirectly, and does not necessarily imply a mechanical connection.

As used in this disclosure, an "electric motor" is a device that converts electric energy into rotational mechanical energy.

As used herein, "energize" and/or "energization" refer to the application of an electrical potential to a system or subsystem.

As used herein, "front" indicates the side of an object that is closest to a forward direction of travel under normal use of the object or the side or part of an object that normally presents itself to view or that is normally used first. "Rear" or "back" refers to the side that is opposite the front.

As used herein, the word "hose" is intended to include hoses, tubing, piping, and other conduits capable of directing a flow of a gas or a liquid. When referring to a hose in this disclosure, the terms inner diameter and outer diameter are used as they would be used by those skilled in the plumbing arts.

As used in this disclosure, a "pump" is a mechanical or electromechanical device that uses suction or pressure to raise or move fluids, compress fluids, or force a fluid into an inflatable object. As non-limiting examples, fluids may include both liquids, such as water, and gases, such as air.

As used herein, a "reel" refers to a cylindrical object with side walls around which a wire, filament, thread, cord, cable, string, line, rope, hose, tubing, or other rope-like object is wound.

As used in this disclosure, a "reservoir" refers to a container or containment system that is configured to store a liquid.

As used in this disclosure, a "spring" is a device that is used to store mechanical energy. This mechanical energy will often be stored by deforming an elastomeric material that is used to make the device, by the application of a torque to a rigid structure, or by a combination thereof. In some embodiments, the rigid structure to which torque is applied may be composed of metal or plastic.

As used in this disclosure, a "switch" is an electrical device that starts and stops the flow of electricity through an electric circuit by completing or interrupting an electric circuit. The act of completing or interrupting the electrical circuit may be called actuation. Completing or interrupting an electric circuit with a switch is often referred to as closing or opening a switch, respectively. Completing or interrupting an electric circuit is also referred to as making or breaking the circuit, respectively.

As used herein, "thermoelectric cooler" or TEC refers to a solid state heat pump that utilizes the Peltier effect to produce a temperature differential between opposing surfaces of the TEC. A TEC may be used to heat or cool an item, depending upon which side of the TEC is placed adjacent to the item and which direction the electrical current flows.

As used in this disclosure, a "tube" is a hollow cylindrical device that is used for transporting liquids and/or gases. In this disclosure, the terms inner diameter and outer diameter are used as they would be used by those skilled in the plumbing arts. The line that connects the center of the first base of the cylinder to the center of the second base of the cylinder and is equidistant from the outer surface of the tube for its entire length is referred to as the centerline of the tube. When two tubes share the same centerline they are said to be aligned. When the centerlines of two tubes are perpendicular to each other, the tubes are said to be perpendicular to each other. As used here, "tubing" refers to a tube that is flexible or resilient.

As used in this disclosure, a "valve" is a device that is used to control the flow of a fluid, either gas or liquid, through a pipe or to control the flow of a fluid into and out of a container. Some valves may have multiple ports and may allow the diverting or mixing of fluids.

As used in this disclosure, a "vehicle" is a device that is used for transporting passengers, goods, or equipment.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A vehicular water-dispensing system comprising:
   a water dispensing system and a refrigeration system;
   wherein the vehicular water-dispensing system is adapted to dispense water to occupants of a vehicle from a water reservoir located in said vehicle via a first retractable hose with a first mouthpiece and a second retractable hose with a second mouthpiece both of which are accessible within a passenger compartment of the vehicle;
   wherein the water dispensing system comprises the water reservoir, a filter, a pump, a valve, the first retractable hose, the second retractable hose, the first mouthpiece, and the second mouthpiece;
   wherein the water stored in the water reservoir flows through the filter to remove impurities and is pumped to the valve;
   wherein the valve starts and stops the flow of the water to the first mouthpiece via the first retractable hose or to the second mouthpiece via the second retractable hose;
   wherein the water reservoir is a container for holding the water;
   wherein the water reservoir has a refill port located on the top of the water reservoir and has a reservoir outlet located on the bottom of the water reservoir;
   wherein the refill port is covered by a filler cap that is removed to refill the water reservoir;
   wherein the water flowing out of the reservoir outlet is routed to the filter by a first tube;
   wherein the filter houses porous material that removes impurities from the water as the water flow through the filter;
   wherein the filter comprises a filter inlet and a filter outlet;
   wherein the water enters the filter through the filter inlet and exits the filter through the filter outlet;
   wherein as the water passes through the filter impurities in the water become trapped within the filter such that the water exiting through the filter outlet is cleaner than the water that entered the filter;
   wherein the porous material comprises a filter cartridge that is replaceable;
   wherein the water flowing out of the filter is routed to the pump via a second tube;
   wherein the pump comprises a pump inlet and a pump outlet;
   wherein the pump forces the water from the pump inlet to the pump outlet when the pump is activated;
   wherein the pump is a reciprocating pump or a centrifugal pump;
   wherein the pump is mechanically linked to an electric motor;
   wherein the pump is activated when the electric motor is energized;
   wherein the electric motor converts electrical energy into mechanical energy;
   wherein the electric motor is energized by electricity provided from the vehicle via a pump electrical cord;
   wherein a pressure sensitive switch located in the pump controls the energization of the electric motor such that the electric motor is only energized when the pressure sensitive switch senses demand for the water at the pump outlet;
   wherein the water flowing out of the pump is routed to the valve via a third tube;
   wherein the valve comprises a valve inlet, a first valve outlet, and a second valve outlet;
   wherein the valve permits and block the flow of the water from the valve inlet to the first valve outlet or from the valve inlet to the second valve outlet;
   wherein the valve permits the flow of the water from the valve inlet to the first valve outlet when the valve senses suction applied to the first valve outlet;
   wherein the valve permits the flow of the water from the valve inlet to the second valve outlet when the valve senses suction applied to the second valve outlet.

2. The vehicular water-dispensing system according to claim 1
   wherein the water flowing out of the first valve outlet is routed to the first retractable hose via a fourth tube;
   wherein the water flowing out of the second valve outlet is routed to the second retractable hose via a fifth tube.

3. The vehicular water-dispensing system according to claim 2
   wherein the fourth tube and the fifth tube are routed through a chassis and/or a body of the vehicle.

4. The vehicular water-dispensing system according to claim 3
   wherein the first retractable hose is tubing that is pulled out of a left side of a dashboard and which will retract into the dashboard when released;
   wherein the first retractable hose winds around a first reel when retracted into the dashboard;
   wherein the first reel is spring-load and pressure applied to the first retractable hose at the front of the dashboard allows the first reel to rotate such that the first retractable hose is pulled off of the first reel and out of the front of the dashboard;
   wherein when the pressure is released, the first reel rotates in the opposite direction and pulls the first retractable hose back into the dashboard and around the first reel.

5. The vehicular water-dispensing system according to claim 4
   wherein the second retractable hose is tubing that is pulled out of the right side of the dashboard and which will retract into the dashboard when released;
   wherein the second retractable hose winds around a second reel when retracted into the dashboard;
   wherein the second reel is spring-load and pressure applied to the second retractable hose at the front of the dashboard allows the second reel to rotate such that the second retractable hose is pulled off of the second reel and out of the front of the dashboard;
   wherein when the pressure is released, the second reel rotates in the opposite direction and pulls the second retractable hose back into the dashboard and around the second reel.

6. The vehicular water-dispensing system according to claim 5
   wherein the first mouthpiece is adapted to deliver the water from the first retractable hose into the mouth of one of the occupants of the vehicle;
   wherein the first mouthpiece couples to the end of the first retractable hose on the left side of the dashboard;
   wherein the first mouthpiece is removable and replaceable.

7. The vehicular water-dispensing system according to claim 6
  wherein the second mouthpiece is adapted to deliver the water from the second retractable hose into the mouth of one of the occupants of the vehicle;
  wherein the second mouthpiece couples to the end of the second retractable hose on the right side of the dashboard;
  wherein the second mouthpiece is removable and replaceable.

8. The vehicular water-dispensing system according to claim 7
  wherein the refrigeration system chills the water that is stored in the water reservoir;
  wherein the refrigeration system is located adjacent to the water reservoir.

9. The vehicular water-dispensing system according to claim 8
  wherein the refrigeration system is energized by electricity provided from the vehicle via a refrigeration system electrical cord;
  wherein the refrigeration system comprises one or more evaporators, one or more condensers, one or more compressors, one or more expansion valves, one or more thermoelectric coolers, or combinations thereof.

10. The vehicular water-dispensing system according to claim 9
  wherein the one or more evaporators, the one or more condensers, the one or more compressors, the one or more expansion valves, or
  combinations thereof are shared between the refrigeration system and a heating and cooling system of the vehicle.

11. The vehicular water-dispensing system according to claim 9
  wherein the vehicular water-dispensing system comprises the dashboard of the vehicle;
  wherein the dashboard is modified by placing a first hose aperture and a second hose aperture on opposing sides of the dashboard and by mounting the first reel and the second reel behind the dashboard.

* * * * *